(12) United States Patent
Seol et al.

(10) Patent No.: US 9,749,200 B2
(45) Date of Patent: Aug. 29, 2017

(54) METHOD AND APPARATUS FOR DETECTING APPLICATION

(71) Applicant: Samsung Electronics Co., Ltd., Gyeonggi-do (KR)

(72) Inventors: Jae-Young Seol, Gyeonggi-do (KR); Sang-Ig Rho, Seoul (KR); Ho-Cheol Lee, Gyeonggi-do (KR); Jae-Jin Kim, Gyeonggi-do (KR); Jong-Hun Kim, Gyeonggi-do (KR); Sung-Jun Do, Seoul (KR)

(73) Assignee: Samsung Electronics Co., Ltd (KR)

( * ) Notice: Subject to any disclaimer, the term of this patent is extended or adjusted under 35 U.S.C. 154(b) by 287 days.

(21) Appl. No.: 14/592,540

(22) Filed: Jan. 8, 2015

(65) Prior Publication Data

US 2015/0195155 A1    Jul. 9, 2015

(30) Foreign Application Priority Data

Jan. 8, 2014    (KR) .................. 10-2014-0002414

(51) Int. Cl.
  *H04L 12/50* (2006.01)
  *H04L 12/26* (2006.01)
  *H04L 29/08* (2006.01)
  *H04L 29/06* (2006.01)

(52) U.S. Cl.
  CPC .......... *H04L 43/028* (2013.01); *H04L 43/026* (2013.01); *H04L 67/04* (2013.01); *H04L 67/16* (2013.01); *H04L 69/22* (2013.01); *H04L 65/10* (2013.01); *Y02B 60/33* (2013.01)

(58) Field of Classification Search
  CPC ............................ H04L 43/028; H04L 43/026
  USPC ........................................ 370/252, 253, 254
  See application file for complete search history.

(56) References Cited

U.S. PATENT DOCUMENTS

2010/0150104 A1    6/2010  Yoon et al.
2013/0117140 A1*   5/2013  Kashanian .......... G06Q 30/0601
                                                   705/26.1
2016/0119332 A1*   4/2016  Pitroda ................ G06F 21/606
                                                       726/6

FOREIGN PATENT DOCUMENTS

KR    1020100070123    6/2010

* cited by examiner

*Primary Examiner* — Dang Ton
(74) *Attorney, Agent, or Firm* — The Farrell Law Firm, P.C.

(57) ABSTRACT

Provided is a method for detecting an application in a wireless communication system. The method includes receiving and inspecting a packet; detecting flows from the packet using a predefined signature; granting a score to each of the detected flows, and summing the granted scores by integrating the detected flows for each application; comparing the summed score of the flows integrated for each application with a preset value; and determining that an application is detected, if the summed score is greater than the preset value.

12 Claims, 6 Drawing Sheets

- ● Suspicious flow
- ○ unrelated flow
- ◌ Suspicious flow set at $t_0$ (410)
- ◌ Suspicious flow set at $t_1$ (420)
- ○ Flow set within $[t_0, t_0+w]$ from a UE (430)
- ○ Flow set within $[t_1, t_1+w]$ from a UE (440)

| Flow (k) | $p_f$ | Score (m) | Sum of scores (S) |
|---|---|---|---|
| 1 | 0.7 | 0.4 | 0.4 |
| 2 | 0.9 | 0.1 | 0.5 |
| 3 | 0.8 | 0.2 | 0.7 |
| 4 | 0.8 | 0.1 | 0.8 |
| 5 | 0.9 | 0.1 | 0.9 (window changed) |
| 6 | 0.8 | 0.2 | 0.7 (=0.9-0.4+0.1) |
| 7 | 0.9 | 0.1 | 0.9 |
| 8 | 0.7 | 0.3 | 1.3 > q5 (=1.0) |

$$M(S) = c_1 \exp\left\{-\frac{p_f(s)}{c_2(1-p_f(s))}\right\}, \text{ where } c_1 \text{ and } c_2 \text{ denote scaling contants}$$

```
INVITE sip:01022335540@123.123.123 SIP/2.0
Via: SIP/2.0/UDP
123.123.123:63190;rport;branch=z9hG4bKPjqEfYYe6ObNaWZbikb.m2iIL3.CUaVV8S
...
v=0
c=IN IP4 192.168.0.61
m=audio 16384 RTP/AVP 3 101

Real-Time Transport Protocol
  [Stream setup by SDP (frame 170)]
    10.. .... = Version: RFC 1889 Version (2)
    ..0. .... = Padding: False
    ...0 .... = Extension: False
    .... 0000 = Contributing source identifiers count: 0
    0... .... = Marker: False
    Payload type: GSM 06.10 (3)
    Sequence number: 29338
    [Extended sequence number: 94874]
    Timestamp: 320
    Synchronization Source identifier: 0x50b1f278 (1353839224)
    Payload: d6a1aba5a274a064ee68c92db0c014f3844cd79140d353a9...

.....0..1.0...U....GB1.0...U....Greater Manchester1.0...U....Salford1.0...U.
..COMODO CA Limited1/0-..U...&COMODO High-Assurance Secure Server CA0..
120717000000Z.140808235959Z0...1.0...U....KR1.0...U....123-
4567.0...U....Seoul1.0...U....KangNam1:08..U...1(Samseong-dong Ex-Voip B/D 123,
Seolleung-ro1.0...U.
..SB Interactive1#0!..U....Development Operating Team1$0"..U....Hosted by Example-
Voip Co., Inc.1.0...U....PremiumSSL Wildcard1.0...U...* example-voip co.kr0.."0

<stream:stream to="msg example-voip co.kr" xmlns="jabber:client"
xmlns:stream="http://etherx.jabber.org/streams" version="1.0">
<?xml version='1.0' encoding='UTF-8'?><stream:stream
xmlns:stream="http://etherx.jabber.org/streams" xmlns="jabber:client"
```

FIG.7

```
                    Common Service components
Server Name: accounts.google.co.kr
Server Name: accounts.google.com
Server Name: ajax.googleapis.com
Server Name: apis.google.com
Server Name: g0.gstatic.com
Server Name: g1.gstatic.com
Server Name: g2.gstatic.com
Server Name: g3.gstatic.com
Server Name: lh6.googleusercontent.com
Server Name: plus.google.com
Server Name: ssl.gstatic.com
Server Name: talkgadget.google.com GET /orkut/img/iphone/btn-pill-right-off.gif HTTP/1.1
Host: g0.gstatic.com
Referer: http://m.orkut.com/Home
Accept-Encoding: gzip, deflate
Accept: */*
Accept-Language: ko-kr
Connection: keep-alive
```

FIG.8

METHOD AND APPARATUS FOR DETECTING APPLICATION

PRIORITY

This application claims priority under 35 U.S.C. §119(a) to a Korean Patent Application filed in the Korean Intellectual Property Office on Jan. 8, 2014 and assigned Ser. No. 10-2014-0002414, the entire disclosure of which is incorporated herein by reference.

BACKGROUND

1. Field of the Disclosure

The present disclosure relates to a method and apparatus for detecting an application using packet inspection in a communication system.

2. Description of the Related Art

In order for $3^{rd}$ Generation Partnership Project (3GPP) systems to properly allocate resources such as frequency bandwidth, to a plurality of communication terminals in a wireless communication system, such as a Long Term Evolution (LTE) system, a packet inspection device may perform Deep Packet Inspection (DPI). In other words, the packet inspection device may identify the resource usage of each communication terminal in real time, and authenticate the reasonability thereof. Further, the packet inspection device may determine whether to allocate resources to each communication terminal, and determine the amount of resources allocated. In this way, it is possible to operate the resources more efficiently in the wireless communication system.

DPI may inspect up to Layer 7 (L7) data of a user packet. Using DPI, it is possible to detect a protocol or an application (or an application service), or to extract metadata information included in an upper layer.

The identification information obtained through DPI and the data extracted through DPI may be used for purposes of determination of the operator's accounting policy, provision of Quality of Service (QoS) regarding the type of an application, and detection of the occurrence of a network failure and load distribution due to fraudulent use.

A method for detecting an application using packet inspection may include a tuple information matching method, a method for matching a common data pattern in a payload, and a method for matching behavior analysis data of an application. The tuple information matching method is a method for identifying an application by comparing the tuple information that is used in common by an application or protocol desired to be identified. The common data pattern matching method is a method for detecting an application by registering in a database a common pattern included in an application to be detected, and comparing the common pattern registered in the database with a pattern in a payload of a packet to be inspected. The behavior analysis data matching method is a method of making use of statistical information of a packet such as bits/sec (bps), packets/sec (pps), or using a learning-based pattern matching approach such as a neural network and machine learning.

Recently, network operators have enhanced the function of the DPI for the reduction of Operation Expenditure (OPEX) through the deployment of an intelligent network. On the other hand, content providers providing a Voice over Internet Protocol (VoIP) or a video streaming service may avoid service restrictions by making application detection by a network operator impossible, may make it difficult to find a common pattern using data encryption or proprietary protocol to enhance the security of user data, or may make it difficult to distinguish between applications by using a standard protocol such as Real-time Transport Protocol (RTP) and Session Initiation Protocol (SIP). Therefore, it is difficult for network operators to provide customized plans specialized for Social Networking Service (SNS), a mail service and the like.

SUMMARY

The present disclosure has been made to address at least the above-mentioned problems and/or disadvantages and to provide at least the advantages described below. Accordingly, an aspect of an embodiment of the present disclosure is to provide a method and apparatus for detecting an application with low detection cost and high accuracy by detecting an application using the flows that an application generates for service provision.

In accordance with an aspect of the present disclosure, there is provided a method for detecting an application in a wireless communication system. The method includes receiving and inspecting a packet; detecting flows from the packet using a predefined signature; granting a score to each of the detected flows, and summing the granted scores by integrating the detected flows for each application; comparing the summed score of the flows integrated for each application with a preset value; and determining that an application is detected, if the summed score is greater than the preset value.

In accordance with another aspect of the present disclosure, there is provided an apparatus for detecting an application in a wireless communication system. The apparatus includes an inspection unit configured to receive and inspect a packet; a flow detection unit configured to detect flows from the packet using a predefined signature; a score mapping unit configured to store a score to be granted to each of the detected flows; a score summation unit configured to integrate the detected flows for each application, and sum the scores granted to the detected flows; and an application detection unit configured to compare the summed score of the flows integrated for each application with a preset value, and determine that an application is detected, if the summed score is greater than the preset value.

BRIEF DESCRIPTION OF THE DRAWINGS

The above and other aspects, features and advantages of certain embodiments of the present disclosure will be more apparent from the following description taken in conjunction with the accompanying drawings, in which:

FIG. 7 illustrates an example of detecting an application providing a VoIP service that is based on a standard protocol such as SIP; and FIG. 8 illustrates an example of detecting an application for an SNS service that uses an open Application Programming Interface (API).

Throughout the drawings, like reference numerals will be understood to refer to like parts, components, and structures.

DETAILED DESCRIPTION OF EMBODIMENTS
OF THE PRESENT DISCLOSURE

The following description with reference to the accompanying drawings is provided to assist in a comprehensive understanding of embodiments of the disclosure as defined by the claims and their equivalents. It includes various specific details to assist in that understanding but these are to be regarded as mere examples. Accordingly, those of ordinary skill in the art will recognize that various changes and modifications of the embodiments described herein can be made without departing from the scope and spirit of the disclosure. In addition, descriptions of well-known functions and constructions may be omitted for clarity and conciseness.

The terms and words used in the following description and claims are not limited to their dictionary meanings, but are merely used to enable a clear and consistent understanding of the disclosure. Accordingly, it should be apparent to those skilled in the art that the following description of embodiments of the present disclosure is provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Figure 1:
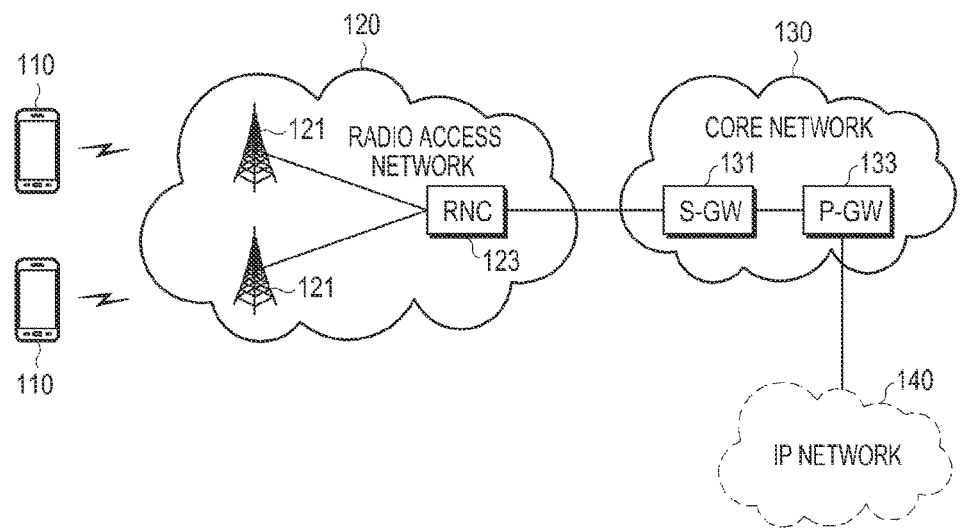
FIG. 1 schematically illustrates a wireless communication system to which an embodiment of the present disclosure is applied.

FIG. 1 schematically illustrates a wireless communication system to which an embodiment of the present disclosure is applied.

Referring to FIG. 1, the wireless communication system may include communication terminals 110, a radio access network 120, a core network 130, and an Internet Protocol (IP) network 140.

The communication terminal 110, which has mobility, transmits and receives a packet in accordance with a wireless communication protocol. The communication terminal 110 performs a variety of applications, and generates or uses a packet using any one of the applications.

The radio access network 120 may constitute a UMTS Terrestrial Radio Access Network (UTRAN). The radio access network 120 includes a plurality of base stations 121, and a radio network controller (RNC) 123. Each of the base stations 121 wirelessly accesses the communication terminal 110 to communicate with the communication terminal 110. The base stations 121 access the communication terminal through a Uu interface. The radio network controller 123 manages the communication terminals 110, and controls radio resources for the base stations 121. Here, the radio network controller 123 may access the base station 121 through an Iu interface. In other words, the radio network controller 123 allocates radio resources to the base stations 121, and the base stations 121 provide radio resources to the communication terminals 110. The radio network controller 123 may directly wirelessly access the communication terminals 110.

The core network 130 supports packet exchange of the radio access network 120. The core network 130 includes a Serving GateWay (S-GW) 131 and a Packet Data Network GateWay (P-GW) 133.

The S-GW 131 manages the mobility of the communication terminals 110, manages a session for packet transmission/reception, and handles authentication and accounting according thereto. The P-GW 133 performs a routing function for a packet, manages IP addresses of the communication terminals 110, and manages the session for packet transmission/reception. The P-GW 133 also performs the routing function for a packet. In the core network 130, the P-GW 133 or the S-GW 131 may have a Deep Packet Inspection (DPI) device for performing DPI on a packet for the communication terminals 110 according to an embodiment of the present disclosure. The DPI device may be provided not only in the gateway device, but also in other traffic devices for performing packet processing.

The DPI device receives QoS information regarding the application service from a network manager, and stores and manages the received QoS information. Upon receiving a packet, the DPI device inspects an application service of a packet by analyzing up to the L7 layer of the received packet.

In general, an application may generate a plurality of flows at the same time to exchange user authentication information, control channel information, data channel information and other information, for service execution. Detection of individual flows constituting a service requires different signatures, which have different detection efficiencies. An embodiment of the present disclosure includes granting a score to each of individual flows constituting a service, using these flow detection characteristics, and determining whether an application is identified, by summing scores for the flows each time a flow is detected. If an application is detected using the flow-specific score summation, it is possible to easily detect even an application that can hardly be detected, such as an application that can hardly be identified among applications, using standard protocol such as SIP and RTP; an application that can hardly find a common pattern and that uses the encryption or proprietary protocol; and an application constituting a service using an open API.

Figure 2:
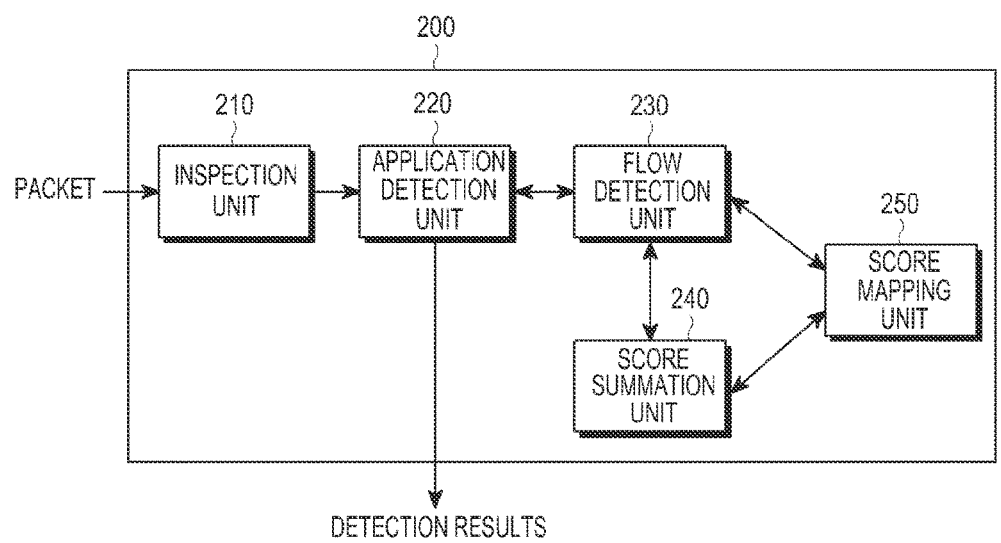
FIG. 2 illustrates a block diagram of a DPI device according to an embodiment of the present disclosure.

FIG. 2 illustrates a block diagram of a DPI device according to an embodiment of the present disclosure.

Referring to FIG. 2, a DPI device 200 includes an inspection unit 210, an application detection unit 220, a flow detection unit 230, a score summation unit 240, and a score mapping unit 250. The inspection unit 210 searches for a service name or an IP from the application data of Layer 4 or higher by inspecting an input packet, and delivers the search results to the application detection unit 220. The application detection unit 220 detects an application based on the results searched in the inspection unit 210. Alternatively, the application detection unit 220 may send a request for flow detection to the flow detection unit 230, and receive the results, based on which the application detection unit 220 may finally determine whether an application is detected. The flow detection unit 230 detects each of the flows constituting an application and grants a score to each flow. The flow detection unit 230 may grant a score to each of the detected flows based on the flow-specific score stored in the score mapping unit 250. If the flow detection unit 230 delivers the results to the score summation unit 240, the score summation unit 240 delivers the results obtained by summing the granted scores of the flows by integrating the detected flows for each application, to the flow detection unit 230. If the flow detection unit 230 delivers the detected flow to the score summation unit without referring to the score mapping unit 250, the score summation unit 240 grants a score to each flow based on the flow-specific score stored in the score mapping unit 250, and delivers the results obtained by summing the scores to the flow detection unit 230.

In this disclosure, an application flow that is detected by a signature, but has not been finally determined as an application flow will be referred to as a suspicious flow. The flow detection unit 230 may detect a suspicious flow, and the score mapping unit 250 may determine and store a score of each suspicious flow. When determining a score of each suspicious flow, the score mapping unit 250 determines the score in consideration of a flow type, a signature type, signature detection accuracy, and the like. The flow detection unit 230 compares a signature of the detected flow with a pre-defined signature, and classifies the flow as a suspicious flow if the signatures are matched to each other. The score summation unit 240 collectively manages suspicious flows for each application. In other words, the flow detection unit 230 receives a score of a flow from the score mapping unit 250 each time a suspicious flow is detected, and delivers the received score to the score summation unit 240, and the score summation unit 240 sums and manages scores of an application group related to the flow.

Alternatively, the flow detection unit 230 may detect a suspicious flow and inform the score summation unit 240 whether a suspicious flow is detected or not, and the score summation unit 240 may directly receive a score of the flow from the score mapping unit 250, and sum scores of each related application.

The flow detection unit 230 looks up a sum of scores of an application from the score summation unit 240 each time a new suspicious flow is detected, and delivers the results to the application detection unit 220. If the sum of scores of suspicious flows is greater than or equal to a reference value, the application detection unit 220 may determine the suspicious flow group as an application. As for the sum of scores, only the scores that are summed within a predetermined time on the basis of the current time using a sliding time window are treated as valid.

A procedure for summing scores using the sliding time window is as follows.

The score mapping unit 250 allocates a score value (m) to be used for score summation for each suspicious flow. If a flow is detected in the flow detection unit 230, the flow detection unit 230 fetches a score value allocated to the flow through the score mapping unit 250, includes the score value in an application-specific sum value (S) managed by the score summation unit 240, and classifies and manages the flow as a suspicious flow of the related application. If flows related to a specific application are continuously detected within a time window (W), and a sum value (S) of the application, which is managed by the score summation unit 240, is greater than or equal to a predetermined reference value (e.g., Qualification Score (QS)), the flow detection unit determines that all flows that have contributed to the score summation are flows of the related application. In this case, QS may be differently set for each application, and an application detection contribution for a common flow that can be included in multiple applications may also be set differently. If the detected flow is a flow that is detected at a time outside the time window (W), the flow detection unit 230 removes the flow from the summation. If the flow is included in a suspicious flow, the flow detection unit 230 excludes the flow from the suspicious flow. In this way, as for the sum value, only the value generated within the time window (W) is used, since the flow that is detected apart in time from the service start time of an application is highly unlikely to be associated with the application. To this end, by differently setting a time window for each application depending on the application characteristics, it is actually possible to prevent the flow that does not belong to the application, from contributing to application identification, or from being identified as a flow that is dependent on the application.

Figure 3:
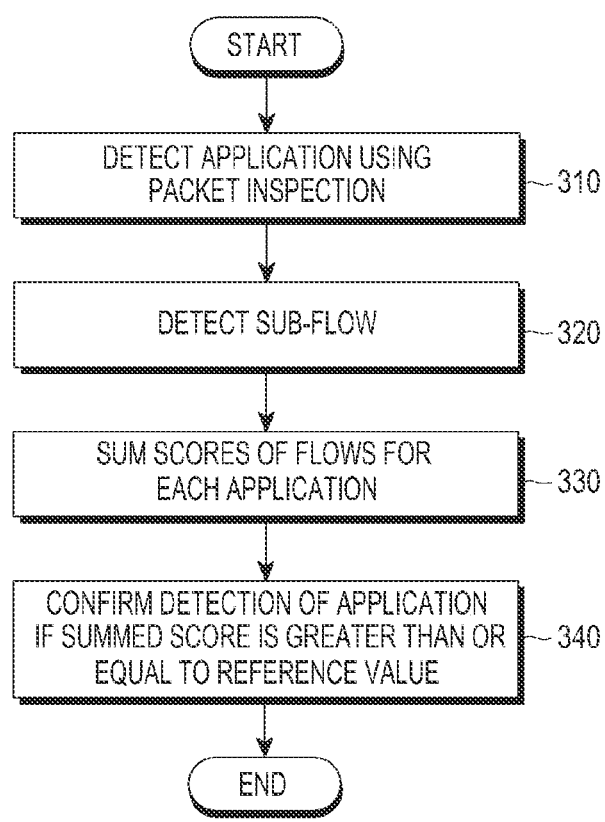
FIG. 3 is a flowchart illustrating a flow detection process according to an embodiment of the present disclosure.

FIG. 3 is a flowchart illustrating a flow detection process according to an embodiment of the present disclosure.

Referring to FIG. 3, a DPI device searches for a service name and an IP of the application data of Layer 4 or higher by inspecting a received packet and detects an application based on the search results in step 310, and detects sub-flows of the detected application in step 320. Next, in step 330, the DPI device grants a score to each of the detected sub-flows and sums scores of the sub-flows for each application. In step 340, the DPI device compares the summed score for each application with a reference value for the application, and finally determines that the application is detected, if the sum value greater than the reference value.

Figure 4:
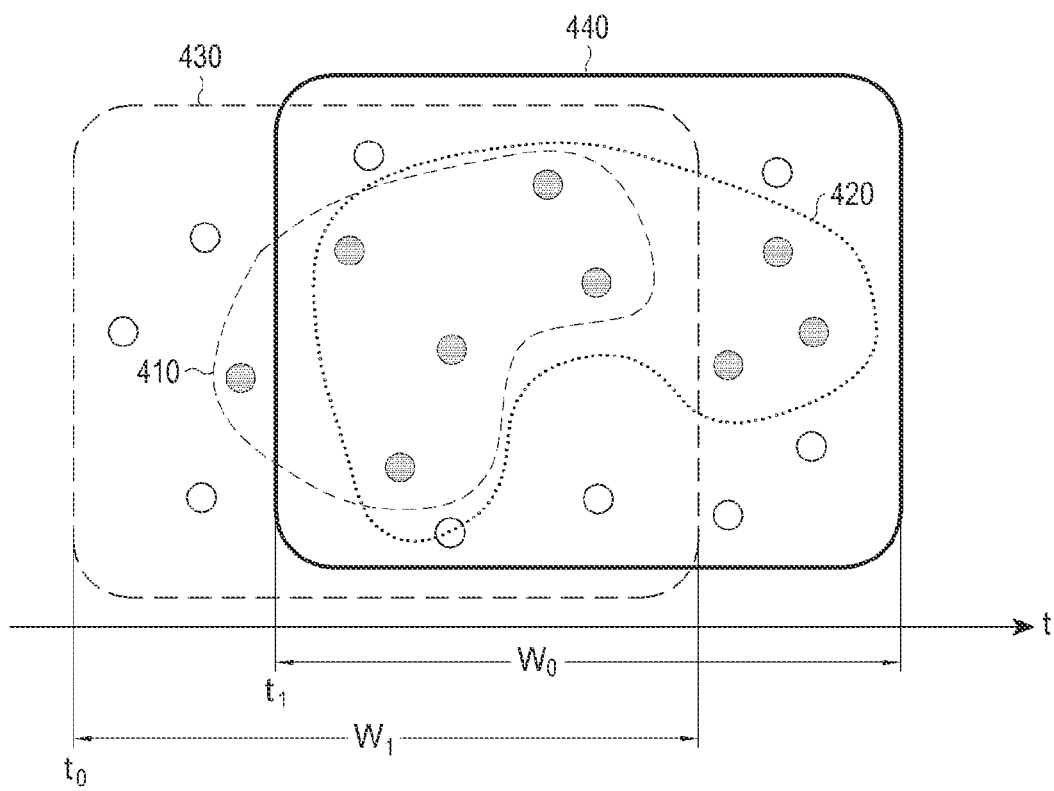
FIGS. 4 and 5 illustrate an example of detecting an application according to an embodiment of the present disclosure.
Figures 5, 6:
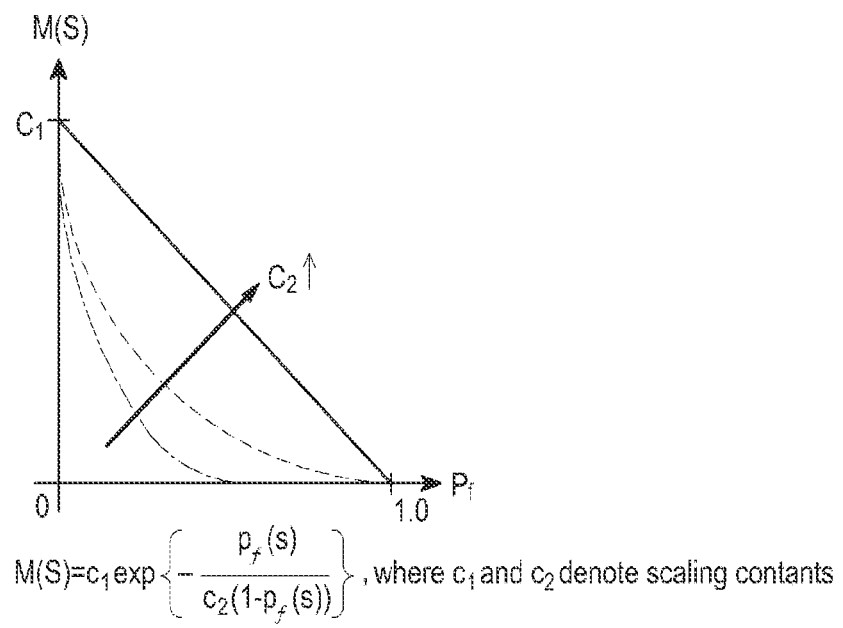
FIG. 6 illustrates an example of a score mapping function according to an embodiment of the present disclosure.

FIGS. 4 and 5 illustrate an example of detecting an application according to an embodiment of the present disclosure.

In FIG. 4, reference numeral 430 represents flows existing within a time window $W_0$ that starts at $t_0$, and reference numeral 410 represents suspicious flows detected within the time window $W_0$ that starts at $t_0$. Reference numeral 440 represents flows existing in a time window $W_1$ that starts at $t_1$, and reference numeral 420 represents suspicious flows detected within the time window $W_1$ that starts at $t_1$.

Referring to FIG. 5, flows 1 to 5 are detected within the time window $W_0$ that starts at $t_0$, and a sum thereof is 0.9. Assuming a case where a QS value of the application is set to 1.0, since a sum of scores of the flows detected within the time window $W_0$ that starts at $t_0$ is less than 1.0 which is the QS value of the application, it is finally determined that the flows 1 to 5 are not included in the target application. In addition, flows 2 to 8 are detected within the time window $W_1$ that starts at $t_1$, and a sum thereof is 1.1. Since a sum of scores of the flows detected within the time window $W_1$ that starts at $t_1$ is greater than 1.0 which is the QS value of the application, it is finally determined that the flows 2 to 8 are included in the target application. In this case, since flow 1 is detected out of the current time window $W_1$, flow 1 is not determined as a flow of the application.

FIG. 6 illustrates an example of a score mapping function according to an embodiment of the present disclosure.

In FIG. 6, a flow score is set to have a value that is inversely proportional to a false detection probability $p_f(s)$ of a flow identification signature (S). In addition, by introducing scaling constants $c_1$ and $c_2$ to the function and changing these values, it is possible to determine a tradeoff between the false detection probability and the detection probability.

FIG. 7 illustrates an example of detecting an application providing a VoIP service that is based on a standard protocol such as SIP and RTP.

Generally, in the case of a Voice over Internet Protocol (VoIP) service that uses the standard protocol such as SIP and RTP, it is not easy to identify an application only with the related flow. Although an RTP IP and port information are included in a Service Delivery Platform (SDP) message included in an INVITE message as shown in FIG. 7, a pattern for identifying an application does not exist. However, an application starts a Transport Layer Security/Secure Sockets Layer (TLS/SSL) flow for user authentication and a Jabber flow for providing a presence service, at the time a call is generated. Since a service name 'example-voip' is included in these flows, it is possible to detect an application using this information. In FIG. 7, a time window size is set to 1 second, and QS is set to 1.0. Flow scores for the standard protocol such as SIP/RTP are set relatively low to 0.2, respectively, and the Jabber and TSL/SSL flows including a string are set to 0.4, respectively. Since the Jabber or TSL/SSL flow can be used not only for the call, but also for other additional services, the QS should be set to a value less than or equal to 1.0, in order not to determine a VoIP service application only with the detection of these flows.

FIG. 8 illustrates an example of detecting an application for an SNS service that uses an open Application Programming Interface (API). In FIG. 8, an application for an SNS service developed by Google is given as an example. Since the SNS service is a service developed by Google, all of authentication, static data, additional services and the like are configured with the open API of Google. Therefore, when an application starts, the common service components may occur at similar times as shown in FIG. 8. Although it is difficult to identify a service only with the individual flows that use the API in this way, it is possible to easily detect an application by using an application detection method according to an embodiment of the present disclosure, which uses a relationship between the flows. In FIG. 8, since a time window size WT is set to 1 second, QS is set to 1.0 (QS=1.0), and an HTTP flow including a string "orkut" occupies a large proportion in detecting an application, a score of the HTTP flow including a string "orkut" is set to 0.9, and scores of flows corresponding to the other open API services are set to 0.02, respectively.

If an application is detected based on the flow-specific score summation according to an embodiment of the present disclosure in this way, the signatures used for flow detection are simple. Thus, even if the false detection probability is high, it is determined whether an application is detected, based on the flows detected within a predetermined time window (e.g., using a correlation between flows), so it is possible to effectively control the false detection probability of the application itself. In addition, by differently setting the flow-specific score and the application-specific QS depending on the characteristics of the application and the characteristics of the flows, it is possible to properly adjust the detection accuracy, the false detection probability and the detection cost for the application according to the system performance. In addition, by increasing the detection accuracy for the application, the network service provider may provide customized plans specialized for the service.

While the disclosure has been shown and described with reference to certain embodiments thereof, it will be understood by those skilled in the art that various changes in form and details may be made therein without departing from the spirit and scope of the disclosure as defined by the appended claims and their equivalents.

What is claimed is:

1. A method for detecting an application in a wireless communication system, the method comprising:
    receiving and inspecting, by a deep packet inspection (DPI) device, a packet;
    detecting flows from the packet using a predefined signature;
    granting a score to each of the detected flows, and summing the granted scores by integrating the detected flows for each application;
    comparing the summed score of the flows integrated for each application with a preset value;
    determining that an application is detected, if the summed score is greater than the preset value; and
    allocating a resource to a communication terminal based on a result of the determining.

2. The method of claim 1, wherein comparing the summed score of the flows is performed each time a new flow is detected.

3. The method of claim 1, wherein summing the granted scores is performed for a flow that is detected within a time window having a preset value.

4. The method of claim 1, wherein the score is determined for each of the detected flows in consideration of at least one of a flow type, a signature type, and a signature detection accuracy.

5. The method of claim 1, wherein the preset value is set to be different for each application.

6. An apparatus for detecting an application in a wireless communication system, the apparatus comprising:
    an inspection unit configured to receive and inspect a packet;
    a flow detection unit configured to detect flows from the packet using a predefined signature;
    a score mapping unit configured to store a score to be granted to each of the detected flows;
    a score summation unit configured to integrate the detected flows for each application, and sum the scores granted to the detected flows;
    an application detection unit configured to compare the summed score of the flows integrated for each application with a preset value, and determine that an application is detected, if the summed score is greater than the preset value; and
    a processor configured to allocate resource to a communication terminal based on a result of the determining.

7. The apparatus of claim 6, wherein the flow detection unit delivers the summed score to the application detection unit each time a new flow is detected.

8. The apparatus of claim 6, wherein the score summation unit performs score summation for a flow that is detected within a time window having a preset value.

9. The apparatus of claim 6, wherein the score is determined for each of the detected flows in consideration of at least one of a flow type, a signature type, and a signature detection accuracy.

10. The apparatus of claim 6, wherein the preset value is set to be different for each application.

11. The apparatus of claim 6, wherein the flow detection unit grants a score to each of the detected flows referring to the score mapping unit, and delivers the granted score to the score summation unit.

12. The apparatus of claim 6, wherein the score summation unit grants a score to each of the detected flows referring to the score mapping unit.

* * * * *